March 10, 1959   O. E. A. ASPEGREN   2,877,106

METHOD FOR THE REDUCTION OF OXIDES

Filed March 11, 1957

INVENTOR.
OLOF E. A. ASPEGREN
BY Fulwider Mattingly & Huntley
Attorneys

United States Patent Office 2,877,106
Patented Mar. 10, 1959

2,877,106

METHOD FOR THE REDUCTION OF OXIDES

Olof Erik August Aspegren, Stockholm, Sweden, assignor to The Oil Shale Corporation, Beverly Hills, Calif., a corporation of Nevada Application March 11, 1957, Serial No. 645,363

21 Claims. (Cl. 75—34)

This invention relates generally to the treatment of solids and, more specifically, to the reduction of solid oxide materials.

This application is a continuation-in-part of my copending U. S. application Serial No. 293,844, now issued as U. S. Patent No. 2,788,313, entitled "Method of Heating or Cooling Granular and/or Pulverulent Materials."

In processes for the reduction of oxides certain conditions must be complied with in order to initiate and maintain the reduction. A certain temperature, usually higher than the initiating temperature, must exist and further a reducing agent must be brought into contact with the material to be reduced.

In those cases, where the reduction process is endothermic, it is not enough to heat the material to be reduced to the required temperature, but it is also necessary to add heat during the reaction in order to prevent the temperature from dropping, which would cause a break, or retardation, of the reaction.

A common method of accomplishing such reducing processes has been to mix carbonaceous fuel into the material to be reduced, which at incomplete combustion forms carbon monoxide (CO) and thus produces, as well as the required heat, the required reducing agent. However, carbon or carbon monoxide as the reducing agent has many disadvantages, which could be avoided by the use of hydrogen as the reducing agent. For example, the reduction temperature often can be kept considerably lower by the use of hydrogen than by the use of carbon monoxide.

The main problem, however, in using hydrogen lies in obtaining a satisfactory method for adding a sufficient amount of heat to the material to be reduced. Trials have been made to add the heat directly by aid of preheated hydrogen gas, or indirectly heating the oxide material through external heating of the reaction vessel, but neither method has been successful.

It is therefore a major object of this invention to provide an improved method for the chemical reduction of solid oxide material.

Another object of the invention is to provide such a method in which the temperature at which the reduction occurs can be accurately controlled.

It is a further object of the invention to provide such a method of high efficiency, wherein heat losses are minimized and the reduction process is most effective.

Still another object of the invention is to provide a process of this character suitable for use with many different materials, and capable of various degrees of reduction.

Figure 1:
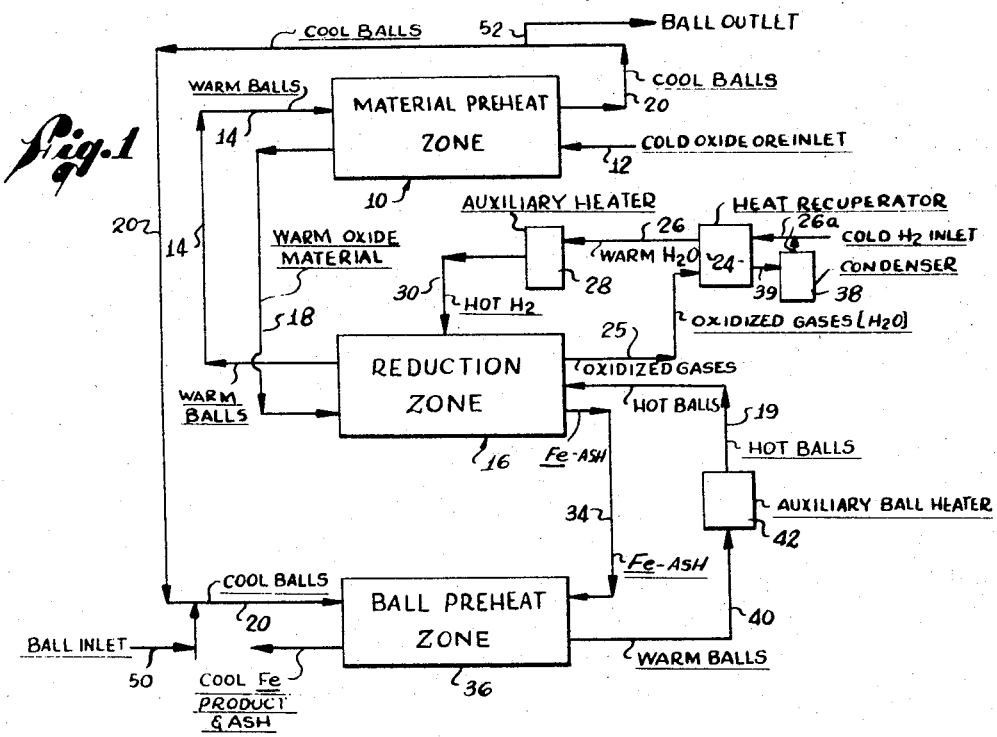
Figure 2:
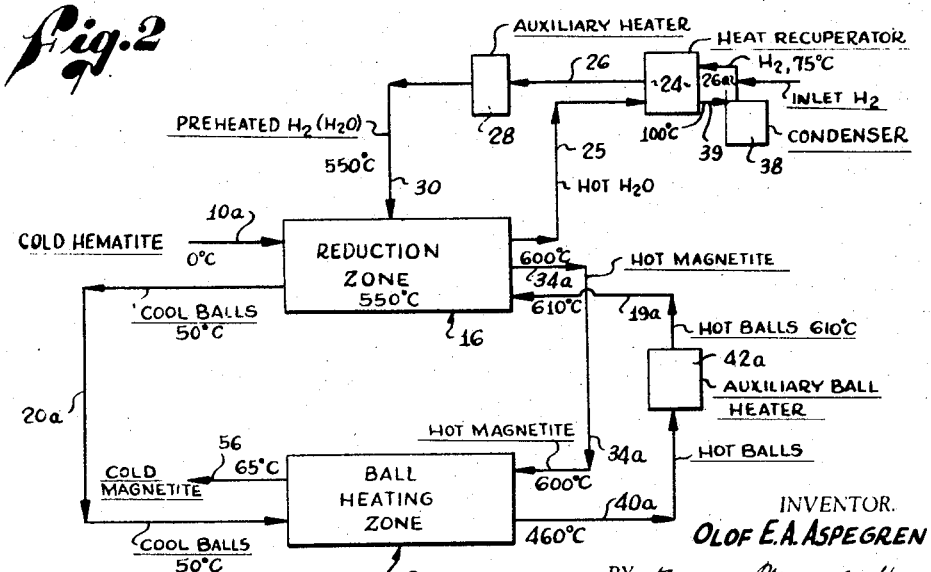

These and other objects and advantages of the invention will become apparent from the following description of various embodiments thereof, and from the drawings illustrating those embodiments, in which Figure 1 is a flow diagram illustrating the improved method of reduction as applied to the reduction of magnetite to elemental iron, and Figure 2 is a flow diagram illustrating the improved method of reduction as applied to the reduction of hematite to magnetite.

According to the present invention, the heat is added to the oxide material by mixing with it certain hot bodies, which act as heat donors, at a rate such that the heat emitted by the bodies substantially suffices for heating the material to reaction temperature and for maintaining the temperature during the reaction. The advantage of this method lies in the fact that the hydrogen need not supply any heat besides its combustion heat, and therefore it is not necessary to feed it at a higher or over-temperature or in a quantity larger than that corresponding to its consumption during the chemical reaction.

It therefore follows that the reaction temperature can be regulated and kept within narrow limits, and also that the gas velocity through the material can be limited so that the fine grained material may be treated without considerable dust losses. This would be practically unaccomplishable if the heat were to be added by means of gas, owing to its low heat capacity per unit volume and the consequent large gas volumes and gas velocity required.

In certain reduction processes, the accurate and close control of temperature is of great importance. Thus, for instance, reduction of magnetite, $Fe_3O_4$, to iron takes place most rapidly and favorably at a temperature of 570° C. if hydrogen is used as the reducing agent. A raise of the temperature of the material above 570° C. during the reduction entails a decrease in the reduction speed and further, certain structural changes occur which are not always desirable. While it is true that a drop in temperature of the material below 570° C. also entails a decrease in reduction speed, the sensitivity of the reduction, to small temperature drops below 570° C., is less than to temperature increases above 570° C. Further, small temperature decreases below 570° C. do not bring about any other disadvantages. Thus, for the reduction of magnetite, a temperature should be aimed at which keeps as close to 570° C. as possible, but which never exceeds 570° C. With a gas as a heat carrier, it would be impossible to meet this condition.

As mentioned, the heat capacity per unit volume of gas is relatively low compared with the heat capacity of solid heat-donors, such as small metal steel bodies or ceramic balls. To maintain the optimum reduction temperature of 570° C., the gas must be introduced at a considerably higher temperature in order to supply heat for both the heating and the endothermic reduction. As a result, local superheating of the material takes place. Alternatively, larger flow rates of gas may be employed, in which case considerable loss of reduced fine particles is encountered. Of course, both superheating and loss of reduced fine (particles) by entrainment is highly disadvantageous and should be avoided.

On the other hand, the herein stated conditions of accurate temperature control can be met if the required heat is added by means of mixed-in preheated heat-donors. As these have a small volume in relation to the heat capacity, their temperature drop need not be so great, even if the throughput rate is kept within reasonable limits. It is thus possible to add sufficient amounts of heat by using balls having a comparatively low initial temperature. This avoids the danger of superheating of the material while simultaneously maintaining the minimum temperature within the reaction range at a suitably high value.

According to the invention, the admixing of heat-donors and the heat exchange is effectuated according to the counterflow principle in a so-called ball furnace disclosed in my patent, U. S. No. 2,592,783. Here the heat-donors, heated to the required temperature, are fed through one end of a horizontal rotating drum, while the material to be reduced is fed at the opposite end of the drum. By the rotation of the drum, heat-donors and material strive to distribute themselves uniformly throughout the whole length of the drum and will move in counterflow relation to each other. Through special features, for instance, choice of different sizes for heat-donors and material, the heat-donors can be separated and removed at the end opposite to that at which they were fed. The material in its turn can be separated and removed at the other end of the drum. The result is that a flow of heat-donors moves in one direction in the drum, while a flow of material moves in the opposite direction.

Because of the counterflow principle, the newly-fed heat-donors, which then are at their highest temperature, meet the already reduced material. Thus this material can receive a final heating, which does not influence the reducing process but which, in certain cases, may be desirable, for instance, in order to lessen the tendency of the final product towards re-oxidation in the open air.

By transferring the reduced material to a second rotating drum where it is mixed with the heat-donors which have been cooled in the reduction drum, one may obtain (a) a cooling of the material before it is taken out into the open air, and (b) a re-heating of the heat-donors, which may mean a heat recovery of a certain economical importance, as a substantial portion of the heat necessary for heating the heat-donors comes from the reduced material. This drum is hereinafter referred to as the heat-donor preheating drum.

The oxide material to be reduced can be preheated in a separate rotating drum in which heat-donors and material are moving in countercurrent, as in the reduction drum. The heat-donors that may be used for this purpose are those which are fed out from the reduction drum and which still retain some heat. These heat-donors thereby are cooled down further and thus are able to act more effectively.

The process may be run in such a way that the heat-donors are cooled down too much in the reduction drum to be utilized as heat-donors in the oxide material preheating drum. Then heat-donors may be used which, to some extent, are reheated in the heat-donor preheating drum.

The heat-donors which have passed through the reduction drum and the other drums, if any, may be heated in auxiliary heating devices and may then again be fed into the reduction drum. The heat-donors are thereby caused to circulate in the process.

The reduced material may be of such a kind that it can be taken out directly and used as powder, or it might be more suitable to form and press it into briquettes. It is also feasible to finish, or semi-finish, through pressing, forging, rolling or otherwise fashioning, the material into wire, bars, hoops, plate and so on. In any case, one may choose between taking the material out hot, or first cooling it down, depending on the circumstances.

The cooling of the material may take place either in a drum, as mentioned before, or by means of an inert gas, or by means of the gas intended for the reduction, in which latter case, a certain heat recovery is obtained.

The reducing gas that is introduced into the reduction drum may be allowed to pass through the free space in the drum above the mixture of oxide material and heat-donors. There it primarily reacts with the top layer of the material which perpetually changes owing to the rotation, but a certain diffusion occurs in the deeper layers too. Another method of feeding the gas into the reduction drum is to introduce it, perhaps at superatmospheric pressure, through louvres in the casing of the drum. If the gas is introduced through louvres, provision may be made to feed the gas only through a number of these louvres, which, during the rotation, are covered by the mixture of material and heat-donors. Thus the gas is forced to pass through the mixture with closer contact and ensuing better yield.

If desired, the reducing gas can be forced through the charge with a velocity just high enough to entrain the smallest particles and extract them from the drum. These small particles may be practically completely reduced and thus form high-quality fine divided metal particles which can be collected in one or more selectively working dust catchers (not shown).

The invention is not necessarily limited to loose heat-donors. Heat-donors, which are fastened to the drum casing, and which, by rotation, are mixed with the material during part of the revolution of the drum have been employed. These donors are made of a material with high thermal conductivity, such as steel, and extend through the casing, being heated from the outside during some part of their revolution, for example, when they are not being mixed with the material. The quantity of heat-donors mixed into the material per unit of time can then be regulated by means of the rotational speed of the drum.

As a specific example of the use of the invention, the reduction of magnetite to elemental iron is described below:

Referring to Figure 1, the cold oxide or material, to be reduced, enters the material preheating drum or zone 10 along line 12 and flows countercurrently to, and in direct heat transfer contact with, warm steel balls entering the opposite end of the zone along line 14. The preheated oxide ore leaves the zone 10 and enters the reduction drum or zone 16 along line 18. The balls, after preheating the oxide material, are considerably cooled and leave the drum 10 to be recycled along line 20 to a preheating zone 36 in a manner to be described.

The preheated oxide material enters one end of the rotatable reduction drum or zone 16 along with hot balls which enter the other end thereof from line 19, at a temperature of from about 30° C. to 75° C., above the optimum reduction temperature, the exact temperature depending upon the quantity introduced, the low inlet temperature of the balls thus precluding superheating of the oxide. The hot balls and material are continuously intermixed in intimate counterflow contact within the zone 16, the material thereby being raised to proper reduction temperature at which time preheated hydrogen gas is introduced into the reduction zone 16 along line 30 to reduce the oxide, the intermixing of gas and oxide material occurring by any of the methods previously described. The heat-exchange in the zone 16 is such that substantially all the oxide material is reduced to iron (at an average temperature of approximately 570° C.), in the central section of the drum 16, without any substantial amount of local superheating thereof, the inlet temperature of the balls being sufficiently high to both heat the previously preheated material to reaction temperature, and to maintain this temperature within the reduction zone 16. Thus, the temperature of the balls leaving the reduction zone 16 along line 14 for the material preheat zone 10, is substantially at a temperature of 570° C. Sometimes to avoid too large a ball throughput, the ball temperature may be allowed to drop as much as 100° C.

The exhaust gases recovered during the reduction process comprise principally hydrogen and superheated steam and are sent to a heat-recovery unit 24 along line 25 where they give up a substantial portion of their heat. The gases are then sent to a condenser 38 via line 39 where some, or all, the water formed in the gas is condensed. The hydrogen gas ($H_2$) is then returned to the heat recovery unit 24, along with fresh $H_2$ entering the unit, along recycle line 26a. The preheated gas is then sent to an auxiliary heater 28 via line 26, and thence to reduction zone 16 along line 30.

The oxide material, after being reduced, comprises mainly iron and ash and is heated as it leaves drum 16 because of its contact with the high-temperatured balls. The sensible heat of the reduced material is utilized by sending this material along line 34 to a ball heating zone or drum 36. Cooled balls, from the material preheating drum 10, enter the opposite end of the ball-preheating zone 36 via line 20 and are heated therein by direct counterflow heat-exchange with the hot reduced material. The preheated warm balls are then sent from the zone 36 along line 40 to an auxiliary ball heater 42 and thence sent, along line 19 to the reduction drum 16, for the reduction of oxide material in the manner described. The reduced material is thus cooled and may be readily magnetically separated from the ash material present.

Ball inlet and outlet lines 50, 52 are connected to line 20 to permit worn balls to be replaced with new balls.

Another specific example of oxide reduction by means of solid heat-transmitting bodies in a rotating drum type of apparatus is the reduction of hematite ($Fe_2O_3$) to magnetite ($Fe_3O_4$). The main difference between such a process and the process just described for the reduction of magnetite, is that the reaction is neither endothermic nor exothermic, and the employment of the heat-carrying bodies or balls in the reduction zone is for the sole purpose of heating the incoming hematite ore to the required reaction temperature. Thus, there is no necessity for the heat-carrying bodies to be of as high a temperature or to be added in as large a quantity per unit of time as in the reduction of magnetite to iron.

Referring now to Figure 2, cold hematite ore, containing approximately one-third pure hematite ($Fe_2O_3$) is introduced into the reduction zone 16 along line 10a, and flows countercurrently to hot balls entering the other end of the reduction zone along line 19a. The optimum reduction temperature of the hematite is obtained in the central portion 32 of the reduction zone, the reduced material leaving the right-hand end of the reduction zone via line 34a at a higher temperature than that of the average temperature in the reduction zone due to the contact of the reduced material with the balls at their highest temperature at the said right-hand end.

As described with reference to Figure 1, hydrogen is added at a temperature approximately equal to the average temperature at which the reduction is to take place and leaves the reduction zone to be sent to a heat-recovery unit, condenser and auxiliary heater unit identical with that described with reference to Figure 1.

At the left-hand end of the reduction zone, the balls, after imparting their heat to the central portion of the reduction zone, are considerably cooled and pass along line 20a into a ball-heating zone 36 of the type described in Figure 1, where the balls flow countercurrently to hot, reduced magnetite material entering the other end of the ball-heating zone along line 34a. By means of the heat exchange in the ball-heating zone 36 the magnetite leaves the end opposite to that at which it entered, at a very low temperature, along line 55, while the balls regain a substantial portion of the heat necessary for the subsequent reduction step. The heated balls leaving the zone 36 are sent along line 40a to an auxiliary heater 42a, where the balls are heated to proper reduction temperature which is approximately 20–50° C. above the average optimum reduction temperature. The thus heated balls are sent from the auxiliary heater 42a along line 19a into the reduction zone 16 to reduce fresh hematite, as previously described.

It can thus be seen that a large part of the heat of the outgoing ore charge is recovered in the ball-reheating zone by means of the countercurrently passing balls and at the same time, the iron product produced leaves the ball-preheating zone at a low temperature for magnetic separation. Also, the iron losses due to the wear of the balls may be recovered by magnetic separation.

As a specific example of the operating temperatures and other conditions in the reduction of hematite to magnetite by means of hydrogen, the following data of an average run is set forth below. It is to be understood that the figures given may vary considerably depending upon the nature of the ore introduced and other factors.

3.0 tons of 0° C. hematite ore (containing approximately 33% iron) is introduced into the reduction zone 16 which is preferably in the form of a rotating drum, of the type described. 5.1 tons of hot balls at a temperature of 610° C. (approximately) is fed to the other end of the reduction zone and passes countercurrently to the hematite ore to heat the ore to a reduction zone temperature of approximately 550° C. in the central portion thereof. The reducing gas, hydrogen, is introduced in stoichiometric amounts and at a temperature of 550° C. to reduce the hematite to magnetite. The reduced material leaves the reduction zone at approximately a temperature of 600° C., being heated as it leaves by the high-temperatured incoming balls. At the other end of the drum, the balls leave the reduction zone at a low temperature of approximately 50° C. and are sent to the ball-heating zone 36, along with the hot reduced material produced in the reduction zone 16. In the ball-heating zone the cold balls pass counter-currently to the hot magnetite material and are thus heated to a temperature of approximately 460° C. as they leave the ball-heating zone. On the other hand, the magnetite leaves the zone 36 at a low temperature of approximately 65° C., at which temperature it may be advantageously magnetically separated from the ore residue.

The hot exhaust gases (containing principally $H_2$ and steam) leave the reduction zone along line 25 to be sent to a heat-recovery unit 24. There their temperature is lowered to 100° C., the cooler gases then passing to a condenser 38 where their temperature is further lowered to 75° C. and in which some of the water in the exhaust gases is condensed. The water proportion in the exhaust gases is thereby restored to a value of approximately 30%, this value being preferable to prevent overheating by means of the gas in the reduction zone 16. The gas then is recycled through the heat-recovery zone where it regains the major part of its heat and is then sent along line 26 to the auxiliary heater 28 for its final heating to a temperature of 550° C.

The flow of gas into the reduction zone is closely controlled, the gas flow being such that it will be below a rate at which the pieced ore material will be carried out of the reduction zone 16.

It is to be noted that the above-described processes are capable of recovering a substantial portion of the heat imparted to the reduction zone by means of the balls and only a minor portion of the heat must be added through auxiliary heating units. For example, in the processes described approximately 75% of the heat may be re-utilized and only approximately 25% must be added for the reheating of the balls and/or reducing gas.

It is to be noted that while the process just described does not employ a material preheat step it may be desirable, in some instances, to preheat the hematite in a separate zone.

While several specific embodiments of my invention have been described in some detail, it will be apparent that many changes and modifications may be made which lie within the scope of the invention. Therefore, I do not intend to be limited by the disclosure herein, but only by the appended claims.

I claim:

1. A process for reducing oxygen-containing materials by means of a reducing gas which process comprises: mixing the material with previously heated bodies of solid material in the presence of said reducing gas in a reduction zone, said bodies acting as heat-donors in the process to supply a substantial amount of heat for the reduction, the heat-donors and the material moving in counter-direction and in direct heat-transfer contact to one another, said counter-direction movement being obtained by feeding the heat-donors and material to opposite ends of said reduction zone and passing them out from the zone at the end opposite to that at which they were fed.

2. A process according to claim 1, in which the bodies, after having emitted their heat in the drum and having been fed from the zone, are replaced by newly-heated bodies, which in their turn are replaced, after having emitted their heat.

3. A process according to claim 1, in which the bodies, after having emitted their heat in the zone and having been fed from the zone, are re-fed into the zone after re-heating and thus are circulated during the reduction process.

4. A process according to claim 1 in which the reducing gas contains free hydrogen, the reduction zone is in the form of a horizontal rotating drum, and the reducing gas is fed through openings in the drum in such a way that the gas must pass through the mixture of hot bodies and material.

5. A process according to claim 1 in which the material after leaving the reduction zone is cooled by blowing cold reducing gas through the material, thus preheating the reducing gas.

6. A process according to claim 1, in which the reduced material is transported from the reduction zone to a preheating zone wherein it imparts some of its physical heat to the bodies which have been cooled down in the reduction zone, and which bodies are directly intermixed with the material and are moving in counter-direction thereto whereby the material is cooled and the bodies are heated.

7. A process according to claim 4 in which the reducing gas is fed at above atmospheric pressures to the drum.

8. A process according to claim 4 in which the oxygen-containing material is a metal oxide, and which is preheated in a separate drum by means of heat-bodies, the heat-bodies used being those which have emitted part of their heat in the reduction drum and which have been sent directly therefrom.

9. A process according to claim 4 in which the temperature and quantity of the heat-bodies is regulated in such a way that the reduction takes place at a temperature that does not materially rise above 570° C.

10. A process according to claim 4 in which the heat-bodies are fed into the reduction drum at such a temperature and in such quantity that the material during the continued counterflow after the reduction proper is heated further to a temperature surpassing 570° C.

11. A process according to claim 4 in which the hydrogen-containing gas for the reduction is fed through the material in such a way that its velocity is high enough to entrain only the smallest particles of the material and extract them.

12. The process for continuously reducing magnetite-containing ore material to iron which comprises the steps of: preheating a moving bed of magnetite in a first preheating zone by means of a countercurrently moving bed of hotter ceramic bodies being directly intermixed therewith; passing said bed of preheated magnetite material into a reduction zone through which reducing hydrogen gas is passed, and in which from 30–75° C. hotter bodies pass countercurrently to the direction of movement of the magnetite to thereby reduce said magnetite at a predetermined temperature, said reduction temperature being maintained at approximately 570° C. by means of said bodies; and passing said hot reduced material into a second preheating zone, wherein the reduced material transfers a portion of its heat to preheat the cooler bodies by solid-to-solid countercurrent intermixture therewith, said preheated bodies circulating from said second preheating zone to said reduction zone thence to said first preheating zone and recycled to said second preheating zone, said bodies becoming progressively cooler and moving from said second preheating zone to said reduction zone to said first preheating zone and regaining part of their initial heat by passing from said first preheating zone to said second preheating zone.

13. A process for continuously reducing hematite to magnetite which comprises the steps of: mixing hematite material with previously heated bodies of solid material in a reduction zone, said bodies transmitting their heat to said material to raise the temperature thereof to an optimum reduction temperature; introducing a reducing gas into said reduction zone to reduce said hematite material at said optimum reducing temperature; and passing said reduced material from said reduction zone to a preheating zone wherein its physical heat is imparted to the solid bodies which have been cooled in the reduction zone, and further heating said bodies to a temperature above said optimum reduction temperature, said bodies being recycled to said reduction zone to heat additional hematite material.

14. The process of claim 13 characterized in that the temperature of said reduction zone is maintained at approximately 550° C., and the temperature of said hot balls intermixed therewith is from 20° to 55° C. higher.

15. A process for continuously reducing oxygen-containing materials which comprises the steps of: mixing said oxygen-containing material with previously heated solid bodies in a reduction zone, said bodies transmitting their heat to said material by direct solid-to-solid contact, to raise the temperature thereof to a predetermined reduction temperature in the presence of a reducing gas to reduce said oxygen-containing material at said reduction temperature; and heating said bodies to a temperature above said reduction temperature, said reheated solid bodies contacting additional oxygen-containing material for the heating thereof.

16. A process for continuously reducing hematite to magnetite which comprises the steps of: mixing hematite material with previously heated bodies of solid material in a reduction zone, said bodies transmitting their heat to said material to raise the temperature thereof to a predetermined reduction temperature; introducing a reducing gas into said reduction zone to reduce said hematite material at said predetermined reducing temperature; and passing said reduced material from said reduction zone to a preheating zone wherein its physical heat is imparted to the solid bodies which have been cooled in the reduction zone, and further heating said bodies to a temperature above said predetermined reduction temperature, said bodies being recycled to said reduction zone to heat additional hematite material.

17. A process for continuously reducing iron oxides which comprises the steps of: mixing said oxide material with previously heated bodies of solid material in a reduction zone, said bodies transmitting their heat to said oxide material to raise the temperature thereof to a predetermined reduction temperature; introducing a reducing gas into said reduction zone to reduce said oxide material at said predetermined reducing temperature; and passing said reduced material from said reducing zone to a preheating zone wherein its physical heat is imparted to the solid bodies which have been cooled in the reduction zone and further heating said bodies to a temperature above said predetermined reduction temperature, said bodies being recycled to said reduction zone to heat additional oxide material.

18. The process of claim 17 characterized in that said oxide material and solid bodies move countercurrently and in direct heat-transfer with one another, and characterized further in that said reduced material and said bodies are countercurrently intermixed in said preheating zone whereby the oxide material is cooled and the bodies are heated.

19. A process for continuously reducing hematite to magnetite which comprises the steps of: mixing hematite material with previously heated bodies of solid material in a reduction zone, said bodies transmitting their heat to said material to raise the temperature thereof to an optimum reduction temperature, said hematite material and solid bodies moving countercurrently to one another, introducing a reducing gas into said reduction zone to reduce said hematite material at said optimum reducing temperature; passing said reduced material from said reduction zone to a preheating zone wherein its physical heat is imparted to the solid bodies which have been cooled in the reduction zone, said reduced material and said bodies being countercurrently intermixed in said preheating zone, and further heating said bodies to a temperature above said optimum reduction temperature, said bodies being recycled to said reduction zone to reduce additional hematite material.

20. A process according to claim 15, in which the bodies after having emitted their heat in the zone and having been fed from the zone, are re-fed into the zone after re-heating and thus are circulated during the reduction process.

21. A process according to claim 15, in which the oxygen-containing material is a metal oxide, and in which the reducing gas contains free hydrogen and the reducing gas is fed through openings in the drum in such a way that the gas must pass through the mixture of hot bodies and material.

References Cited in the file of this patent

UNITED STATES PATENTS

| | | |
|---|---|---|
| 1,979,729 | Brown | Nov. 6, 1934 |
| 2,481,217 | Hemminger | Sept. 6, 1949 |
| 2,545,932 | Tiddy et al. | Mar. 20, 1951 |
| 2,592,783 | Aspegren | Apr. 15, 1952 |
| 2,602,019 | Odell | July 1, 1952 |
| 2,754,105 | Pistorius et al. | July 10, 1956 |
| 2,788,313 | Aspegren | Apr. 9, 1957 |